(12) United States Patent
Gruber (10) Patent No.: US 12,210,399 B2
(45) Date of Patent: ***Jan. 28, 2025

(54) METHOD AND APPARATUS FOR PERFORMING TIMED FUNCTIONS IN A WIRELESS ELECTRONIC DEVICE

(71) Applicant: Ecolink Intelligent Technology, Inc., Carlsbad, CA (US)

(72) Inventor: Brandon Gruber, San Marcos, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,631

(22) Filed: Jan. 26, 2024

(65) Prior Publication Data

US 2024/0160271 A1 May 16, 2024

Related U.S. Application Data (60) Division of application No. 18/096,098, filed on Jan. 12, 2023, now Pat. No. 11,899,521, which is a division of application No. 17/475,803, filed on Sep. 15, 2021, now Pat. No. 11,561,605, which is a continuation of application No. 16/851,953, filed on Apr. 17, 2020, now Pat. No. 11,126,256.

(51) Int. Cl.
  *G06F 1/00* (2006.01)
  *G06F 1/3293* (2019.01)
  *G06F 9/4401* (2018.01)

(52) U.S. Cl.
  CPC .......... *G06F 1/3293* (2013.01); *G06F 9/4418* (2013.01)

(58) Field of Classification Search
  CPC .... G06F 1/3293; G06F 1/3209; G06F 9/4418; H04W 84/18; Y02D 10/00; Y02D 30/70
  See application file for complete search history.

(56) References Cited

U.S. PATENT DOCUMENTS

| | | |
|---|---|---|
| 6,219,217 B1 | 4/2001 | Obermaier |
| 2008/0259948 A1 | 10/2008 | Shvodian |
| 2012/0079301 A1 | 3/2012 | McKenney |
| 2015/0071139 A1 | 3/2015 | Nix |
| 2015/0277545 A1 | 10/2015 | Flowers |
| 2017/0180939 A1 | 6/2017 | Kulkarni |
| 2018/0020407 A1 | 1/2018 | Emmanuel |
| 2018/0075331 A1 | 3/2018 | Sengstaken, Jr. |

OTHER PUBLICATIONS

Extended Search Report from European application No. 21788892.4, dated Jul. 11, 2023, 8 pp.
International Search Report and Written Opinion of international application No. PCT/US2021/026195, dated Jun. 29, 2021, 8 pp.

*Primary Examiner* — Nitin C Patel
(74) *Attorney, Agent, or Firm* — Greenberg Traurig, LLP (57) ABSTRACT

Methods and apparatus for performing timed functions in battery-powered, wireless electronic devices, such as sensors or control modules. Such electronic devices comprise a main processor and a co-processor. When the main processor enters a quiescent state in order to preserve battery life, one or more timed functions are transferred from the main processor to the co-processor just before the main processor enters the quiescent state. When the co-processor determines that it is time to perform the timed function, the co-processor wakes the main processor in order for the main processor to perform the timed function.

18 Claims, 8 Drawing Sheets

METHOD AND APPARATUS FOR PERFORMING TIMED FUNCTIONS IN A WIRELESS ELECTRONIC DEVICE

CROSS-REFERENCE TO RELATED APPLICATIONS

The present application is a divisional of U.S. patent application Ser. No. 18/096,098 filed on Jan. 12, 2023, now U.S. Pat. No. 11,899,521, which is a divisional of U.S. patent application Ser. No. 17/475,803 filed on Sep. 15, 2021, now U.S. Pat. No. 11,561,605, which is a continuation of U.S. patent application Ser. No. 16/851,953, filed on Apr. 17, 2020, now U.S. Pat. No. 11,126,256.

BACKGROUND

Field of Use

The present application relates to the field of wireless sensors. More specifically, the present application relates to techniques to increase battery life in battery-operated wireless sensors.

Description of the Related Art

Wireless sensors are used to detect a wide variety of remote, physical conditions, such as the status of a door or window (i.e., open, closed), the occurrence of motion, the presence of heat, ambient temperatures, vibration, shock, glass breakage, thermal readings, light detection, etc. Such sensors find widespread application in a variety of industries, including home security, home automation, HVAC, and industrial applications. These sensors are often wireless, battery-powered devices, enabling them to easily be placed in remote locations within a home or industrial setting.

Until recently, in order to preserve battery life, sensors were designed as transmit-only devices, i.e., they did not contain a receiver, due to the additional power consumption required by such a receiver. However, recent technological improvements have made battery-powered, two-way sensors (comprising a transmitter and a receiver), a reality. For example, new Z-Wave® 700 series transceiver chips are available from Silicon Laboratories, Inc. of Austin, Texas that contain both a transmitter and a receiver and consume very low power during operation.

The Z-wave 700 series transceiver chips operate in accordance with a Z-wave 700 series communication protocol that allows sensors to relay information over relatively large distances. Sensors that operate in this way are commonly referred to as "mesh" sensors that operate together with other mesh sensors to form a "mesh" network. Other common mesh network technologies include the well-known Zigbee® and Insteon® technologies.

One problem with the new Z-wave 700 series transceiver chips is that they do not maintain accurate time when they are placed into a low-power, quiescent state. The quiescent state is used in order to conserve battery life in battery-powered sensors. However, such battery-powered sensors must generally transmit certain time-sensitive messages during the quiescent state, such as indications of remaining battery life or supervisory messages.

Another problem with battery-powered sensors in general is in the way the remaining battery life is determined. In many prior-art sensors, a processor measures a voltage drop during a high-current draw event, such as when an LED is illuminated, or when a sensor is transmitting. However, in the case of measuring remaining battery life during message transmission, message transmission may become corrupt if a battery life determination is made at the same time of transmission.

It would be desirable to overcome the problems inherent in prior-art, battery-powered, wireless sensors.

SUMMARY

The embodiments described herein relate to methods, systems, and apparatus for performing timed functions in a battery-powered, wireless electronic device, such as a sensor or control module. In one embodiment, a battery-powered, electronic device, comprises a detector for detecting an event in proximity to the electronic device, a transceiver for transmitting and receiving messages, a first memory for storing main processor-executable instructions, a second memory for storing co-processor-executable instructions, a main processor coupled to the detector, the first memory and the transceiver for executing the main processor-executable instructions, and a co-processor coupled to the second memory for executing the co-processor-executable instructions that causes the co-processor to determine that the main processor has entered a quiescent state, start a timer in response to determining that the main processor has entered the quiescent state, and wake the main processor upon expiration of the timer.

In another embodiment, a method is described for performing timed functions in a battery-powered, wireless electronic device, such as a sensor or control module, the method comprising determining, by a co-processor coupled to a main processor, that the main processor has entered a quiescent state, starting a timer in response to determining that the main processor has entered the quiescent state, and waking the main processor upon expiration of the timer.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to a system, method and apparatus for performing timed functions in a battery-powered, wireless electronic device, such as a sensor or control module. A "timed function" comprises any function performed by an electronic device that is dependent on time. Such an electronic device comprises a main processor and a co-processor. When the main processor enters a quiescent state in order to preserve battery life, one or more timed functions are transferred from the main processor to the co-processor just before the main processor enters the quiescent state. When the co-processor determines that it is time to perform the timed function, the co-processor wakes the main processor in order for the main processor to perform the timed function.

Figure 1:
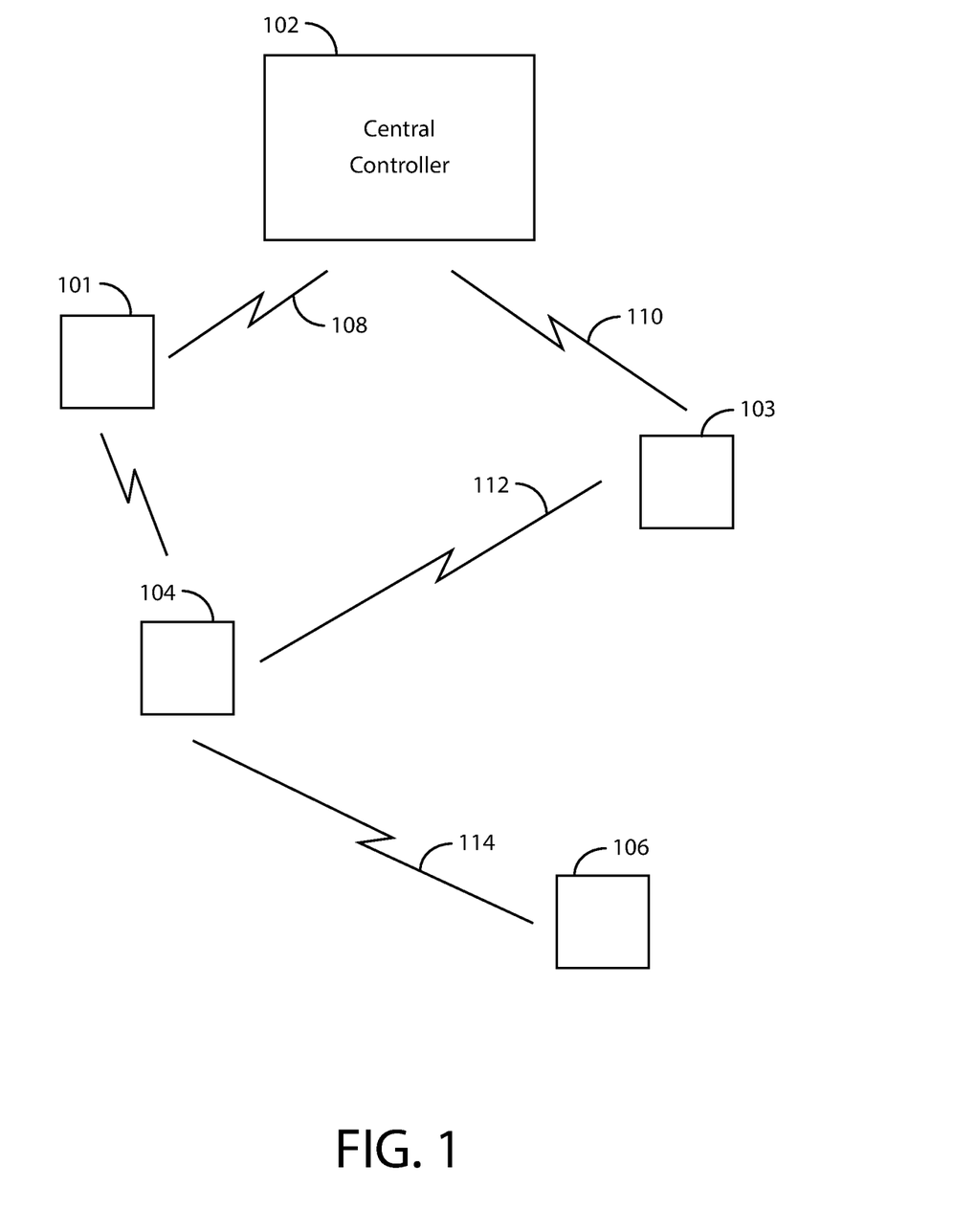
FIG. 1 is a simplified block diagram of a security system comprising a central controller in wireless communication with a number of battery-powered, electronic devices.

FIG. 1 is a simplified block diagram of a security system 100 comprising a central controller 102 in wireless communication with a number of wireless, electronic devices 101, 103, 104, and 106, either directly (as shown by wireless signal 108) or indirectly (as shown by wireless signals 110, 112 and 114). Although a security system is shown in FIG. 1, and this disclosure discusses embodiments of the invention with respect to a door/window sensor, it should be understood that the inventive concepts described herein could be alternatively applied to other battery-powered electronic devices, such as other types of security sensors, industrial sensors, and control modules found in home automation systems.

In some embodiments, two-way communications between/among central controller 102 and one or more devices is possible while in other embodiments, only one-way communications are possible. In the embodiment shown in FIG. 1, two-way communications are possible between/among central controller 102 and the electronic devices.

In one embodiment, security system 100 may utilize indirect communications as shown, commonly referred to as a "mesh" network. A mesh network provides for relaying messages between and among devices, or "nodes", in order to extend the range of the network. In FIG. 1, device 104 is out-of-range from communicating directly with central controller 102, but may nevertheless communicate with central controller 102 via device 103, which relays messages between device 104 and central controller 102, or device 101. Similarly, device 106 communicates with central controller 102 via device 104 and either device 103 or 101. As such, in this embodiment, each device in system 100 is capable of both transmitting and receiving messages from other devices and/or central controller 102. In other embodiments, only direct communications are possible.

The devices shown in FIG. 1 may comprise one or more different types of security sensors (door or window sensors, motion detectors, garage door tilt sensors, glass break sensors, etc.) and one or more "repeaters" that are typically AC-powered devices whose sole function is to relay messages between devices. In FIG. 1, device 103 is such a repeater, device 101 comprises a garage door tilt sensor, device 104 comprises a door/window sensor and device 106 comprises a motion sensor. While only three types of sensors are shown in FIG. 1, and only one of each sensor type, typically a plurality of door/window sensors are used in a security system, each to monitor a particular door or widow, and in some cases, more than one motion detector is used to detect motion in more than one area of a home or business. Additionally, other types of sensors could be used, such as one or more glass break sensors, shock sensors, cameras, etc. Finally, other components could be used in system 100, such as one or more remote keypads that can arm and disarm system 100, audio smoke alarm detectors, etc. Each one of the aforementioned components may embody the transmission efficiency techniques discussed herein.

Door/window sensor 104 is used for monitoring a status of a door or a window, such as when the door or window is opened or closed and, in some embodiments, when a door or window is locked or unlocked. In one embodiment, door/window sensor 104 comprises a well-known reed-switch and magnet combination, where door/window sensor 104 detects door or window movement as the reed switch changes state when the magnet is moved via door or window movement. In other embodiments, other techniques are used to determine that status of a door or a window, such as using an accelerometer to determine door or window movement.

When a door/window event occurs, door/window sensor 104 transmits a status message, in one embodiment, comprising one or more encrypted data packets or "frames" to central controller 102, either directly or through one or more other devices in system 100. The status message comprises an identification of a sensor that transmitted the status message (such as its serial number, a pre-assigned string of numbers and/or letters such as a NodeID in an embodiment where a Z-Wave® protocol is used, or some other unique identifier), and an event type indicating the type of event that occurred (i.e., door open, window closed, motion detected, etc.). Door/window sensor 104 may, in addition, transmit status messages, either at predetermined times or in response to a request from central controller 102.

Door/window sensor 104 additionally transmits other types of messages in addition to status messages, such as a tamper message (indicating that door/window 104 has been tampered with), a heartbeat message (indicating that door/window sensor 104 is still functioning in system 100), and a battery status message (indicating a status of the battery life).

In one embodiment, after transmitting a status message or another type of message, door/window sensor 104 waits a predetermined, configurable amount of time to receive an acknowledgement message, or ACK, from central controller 102, or another device in system 100, to ensure that the message was successfully received by central controller 102. In one embodiment, where messages are encrypted prior to transmission, after an ACK is received, door/window sensor 104 waits a predetermined, configurable amount of time to receive a second response from central controller 102, indicating that the message was successfully decrypted. If either the ACK or the response is not received with the configurable, predetermined time limits, door/window sensor 104 may retransmit the original message. This process may be repeated a configurable number of times, as described in more detail later herein.

Central controller 102 comprises a security panel, which is a well-known device used to monitor all of the sensors in system 100, and also may be used to notify one or more persons when an event is detected by one of the sensors. For example, if a door monitored by door/window sensor 104 is opened, door/window sensor 104 transmits a message to central controller 102 via repeater 103 indicative of the event, e.g., that a door has been opened. In response, when security system 100 is armed, central controller 102 may cause a siren located inside and/or outside a premises monitored security system 100 to produce a very loud, audible siren, to cause one or more lights to turn on, to lock or unlock one or more wireless locks, etc. Alternatively, or in addition, central controller 102 may send an alert to a remote monitoring station that monitors thousands of security systems in order to dispatch relevant authorities when an alarm is received from one of the security systems, typically after verification of the event by an employee of the remote monitoring station.

In some embodiments, the functionality of central controller 102 may be performed by a server located in "the cloud", i.e., a server coupled to a gateway device within a home or business via the Internet. In this embodiment, the gateway device receives event signals from the sensors in system 100 and forwards them to the Internet-based server. The server processes the signals and, as a result, may send commands to the gateway device, such as commands that cause the gateway device to activate a loud siren, to cause one or more lights to turn on, to lock or unlock one or more wireless locks, etc. The server could, additionally, notify a remote monitoring station of events that occur. Thus, references made to "central controller 102" herein shall also include Internet-based processing devices, such as the cloud-based server.

Door/window sensor 104 performs one or more timed functions while in a normal mode of operation. A "timed function" comprises any function performed by door/window sensor 104 that is dependent on time. For example, door/window sensor 104 may be required to transmit a "heartbeat" signal once per hour, or to modulate an LED to illuminate for two seconds upon transmission of any signal, re-transmit a message after not receiving an acknowledgement message after transmission of an original message, etc.

Figure 2:
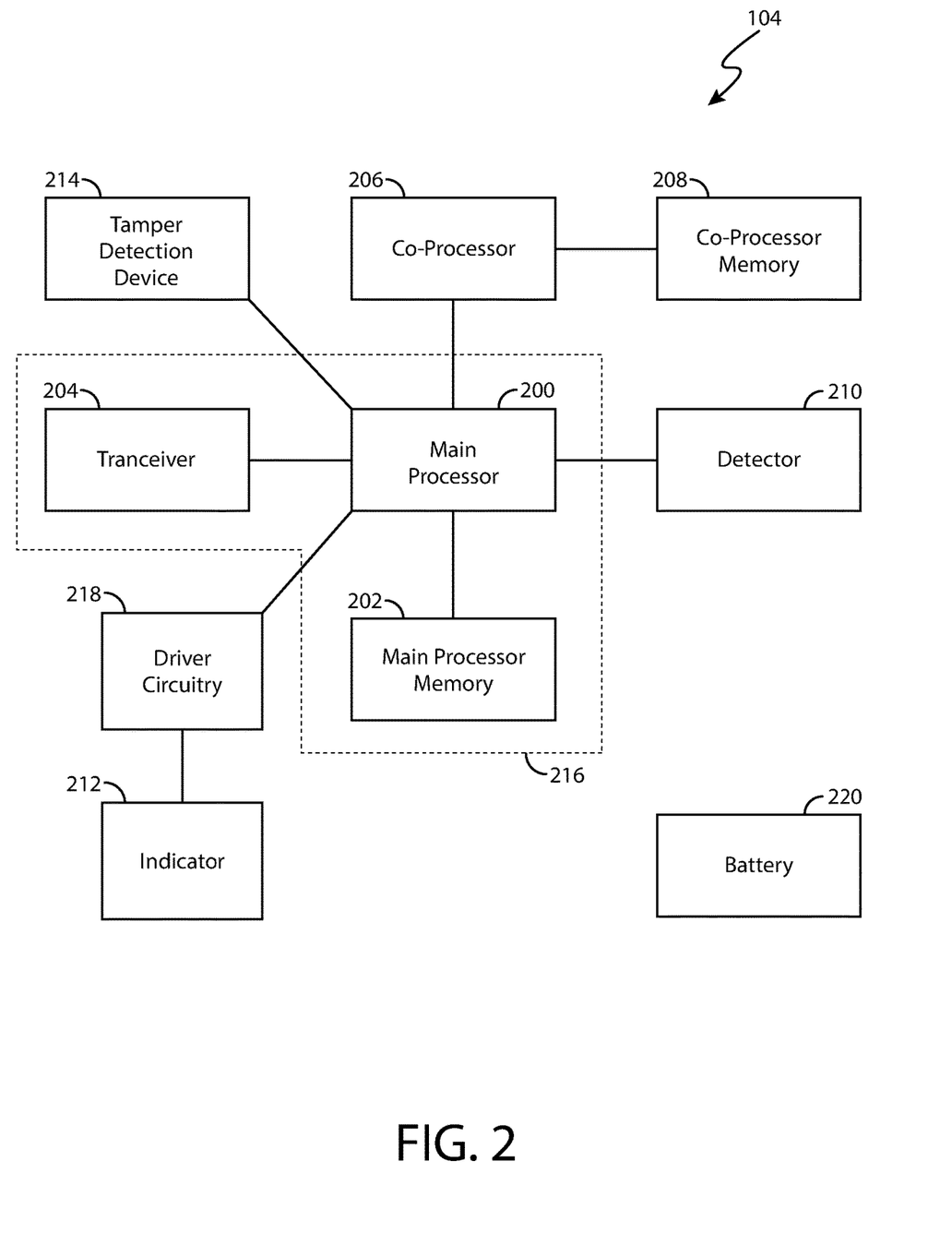
FIG. 2 is a functional block diagram of one embodiment of one of the battery-powered, electronic devices as shown in FIG. 1.

FIG. 2 is a functional block diagram of one embodiment of a battery-powered, electronic device, such as door/window sensor 104, in accordance with the teachings herein. Specifically, FIG. 2 shows main processor 200, main processor memory 202, transceiver 204, co-processor 206, co-processor memory 208, detector 210, indicator 212, tamper detection device 214, indicator driver circuitry 218 and battery 220. It should be understood that these functional blocks may be coupled to one another in a variety of ways, and that not all functional blocks necessary for operation of door/window sensor 104 are shown, for purposes of clarity. It should be further understood that battery powered, electronic devices other than a door/window sensor could comprise the same or similar functional blocks as shown in FIG. 2, such as different security sensors, industrial sensors, home automation control modules (for controlling lights, HVAC systems, appliances, etc.), etc.

Main processor 200 is configured to provide general operation of door/window sensor 104 by executing processor-executable instructions stored in memory 202, for example, executable code. Processor 200 may comprise a general purpose processor, such as an ADuC7024 analog microcontroller manufactured by Analog Devices, Inc. of Norwood Massachusetts, although any one of a variety of microprocessors, microcomputers, and/or microcontrollers may be used alternatively. Due to the relative small size of door/window sensor 104, and the fact that most door/window sensor 104 are battery-powered, processor 200 is typically selected to have low power consumption, small in size, and inexpensive to purchase.

Main processor 200 typically is tasked with performing "timed functions" i.e., any function performed by main processor 200 that is dependent on time. For example, main processor 200 may be required to cause a "heartbeat" signal to be transmitted once per hour, or cause indicator 212 to blink a predetermined number of times with one or more predetermined times between illuminations, cause a message to be re-transmitted a predetermined amount of time after original transmission of the message, etc. Main processor 200 performs timed functions when door/window sensor 104 is operating in a "normal" state of operation, i.e., while transmitting or receiving messages, processing signals received from detector 210, etc. However, in order to save battery life, main processor 200 may enter a quiescent state or mode of operation when door/window sensor 104 is relatively not busy, where main processor 200 causes itself, and often other components, to either power down completely or be placed in a state of operation that consumes very little power, much less than when main processor 200, or other components, operate in the normal mode of operation. Main processor 200 exits the quiescent state and enters the normal mode of operation, typically when a signal is received from detector 210, indicating that an event has occurred proximate to door/window sensor 104, such as a door or window monitored by door/window 104 being opened. Main processor 200 also exits the quiescent state and enters the normal state when it receives an indication from co-processor 206, as described in further detail below.

Main processor memory 202 is coupled to main processor 200 and comprises one or more non-transitory information storage devices, such as RAM, ROM, flash, or other type of electronic, optical, or mechanical memory device. Memory 202 is used to store processor-executable instructions for operation of the door/window sensor 104 as well as any information used by processor 200, such as threshold information, parameter information, identification information, current or previous door or window status information, etc. Main processor memory 202 excludes propagating signals.

Transceiver 204 is coupled to main processor 200 and comprises circuitry to transmit and receive radio-frequency signals between door/window sensor 104 and central controller 102 and/or other electronic dives in proximity to door/window sensor 104, in the case where transceiver is a mesh-network transceiver. In another embodiment, transceiver 204 is replaced by a transmitter, in applications where door/window sensor 104 does not require receiving capability. The radio-frequency signals comprise upconverted and downconverted commands, status messages, requests, etc. Such circuitry is well known in the art and may comprise BlueTooth, Wi-Fi, Z-wave®, Zigbee®, RF, optical, or ultrasonic circuitry, among others.

In one embodiment, main processor 200, main processor memory 202 and transceiver 204 are combined into a single module 216, such as the case with a Z-Wave 700 series ZGM130S SIP Module in an embodiment that utilizes the Z-wave 700 protocol. The ZGM130S SIP Module allows mesh-type, wireless communications between door/window sensor 104 and central controller 102, either directly or through one or more intermediate devices, such as repeater 103, and/or other devices in security system 100, such as device 101. In another embodiments, other system-on-chip modules provide functionality in place of main processor 200, main processor memory 202 and transceiver 204, supporting other common mesh-network protocols such as Zigbee®, RF4CE, 6LoWPAN, WirelessHART EnOcean, ISAIOO.11a, IEEE 802.15.4 and/or others.

Co-processor 206 is coupled to main processor 200 and is configured to perform certain timed functions normally performed by main processor 200 while main processor, and other components, such as transceiver 204, memory 202, and driver circuitry 218 are in the quiescent state. Co-processor 206 comprises one or more microprocessors, microcontrollers, custom ASICs and/or discreet electronic components to perform the functionality of co-processor 206. For example, co-processor 206 may comprise a PIC processor or one of a line of STM8 processors manufactured by STMicroelectronics of Geneva, Switzerland. Co-processor 206 is typically chosen with factors such as size, cost and power consumption in mind.

Co-processor memory 208 is coupled to co-processor 206 and comprises one or more non-transitory information storage devices, such as RAM, ROM, flash, or other type of electronic, optical, or mechanical memory device. Co-processor memory 208 is used to store processor-executable instructions for operation of co-processor 206 as well as any information used by co-processor 208, such as identifications of timed functions and parameters thereto, as will be described later herein. Co-processor memory 208 excludes propagating signals. It should be understood that in many embodiments, co-processor memory 208 is incorporated into co-processor 206 in the form of on-board flash and/or ROM storage.

Detector 210 is coupled to processor 200 and reports, monitors or determines a state, physical condition, attribute, status, or parameter of something, such as the status of a door, window, gate, or other entrance or exit barrier (e.g., open, closed, locked, unlocked, etc.), a temperature, a humidity, motion, shock/vibration, glass breakage, etc. Detector 204 may comprise a reed switch, an ultrasonic transceiver, an infrared transceiver, a tilt sensor, an accelerometer, a motion sensor, microphone, or some other device to report, monitor or determine a state, physical condition, attribute, status, or parameter of a thing or area in proximity to door/window sensor 104.

Indicator driver circuitry 218 is coupled to main processor 200, which in turn is coupled to indicator 212, for providing an audible and/or visual indication that an event, such as transmission, learn status, tamper, etc., has, is or has just occurred. Door/window sensor 104 may transmit a number of different types of signals, including a "door/window open" message, a tamper message, a heartbeat message, a battery low message, or initialization messages when door/window sensor 104 is enrolled into central controller 102. Prior to, during or after an event, main processor 200 causes indicator 212 to illuminate/sound by first energizing driver circuitry 218 (in cases where driver circuitry 218 is held in a quiescent state until needed), and then causing the driver circuitry to energize indicator 212, either for a predetermined time period or in some sort of modulated fashion, i.e., blinking and/or sounding a number of times, to indicate, in some embodiments, a type of event that will, is or has occurred. Driver circuitry 218 comprises circuitry well known in the art for causing indicator 212 to illuminate/sound. When driver circuitry 218 is energized, it may draw a measurable amount of current from battery 220 and an increase in the current draw as current driver 218 energizes indicator 212.

Tamper detection device 214 is coupled to main processor 200 and is used to detect tampering with door/window sensor 104, for example, disabling door/window sensor 104, typically by removing a cover of door/window sensor 104 and removing the battery. Tamper detection device 214 typically comprises a switch that is depressed when a cover of door/window sensor 104 is installed over a reciprocal housing that contains the electronics of door/window sensor 104. The cover is typically manufactured with a physical protrusion that is designed to depress tamper detection device 214 when the cover has been installed. When the cover is removed, the switch changes state, causing main processor 200 to detect this state change. In some embodiments, main processor 200 "latches" any indication of tampering from tamper detection 214, noting the day and time that a tamper was detected, and stores this information in main processor memory 202. In this way, main processor 200 may indicate tampering to central controller 102 at a later time, thus potentially saving battery life.

Battery 220 is coupled to some or all of the functional blocks shown in FIG. 2 to provide a DC voltage for each component from which to operate. In some embodiments, the voltage from battery 220 is provided to a voltage regulator, which produces one or more other voltages for certain components of door/window sensor 104. Battery 220 typically produces a voltage output of between 3 and 5 volts DC. Battery 220 is selected based on operating voltages of the various components of door/window sensor 104, size, cost and a charge that can be delivered by the battery, in amp-hours or milli-amp hours. Popular choices for battery 220 include a CR123A "barrel" type battery or a CR2477 coin cell battery.

Figure 3A:
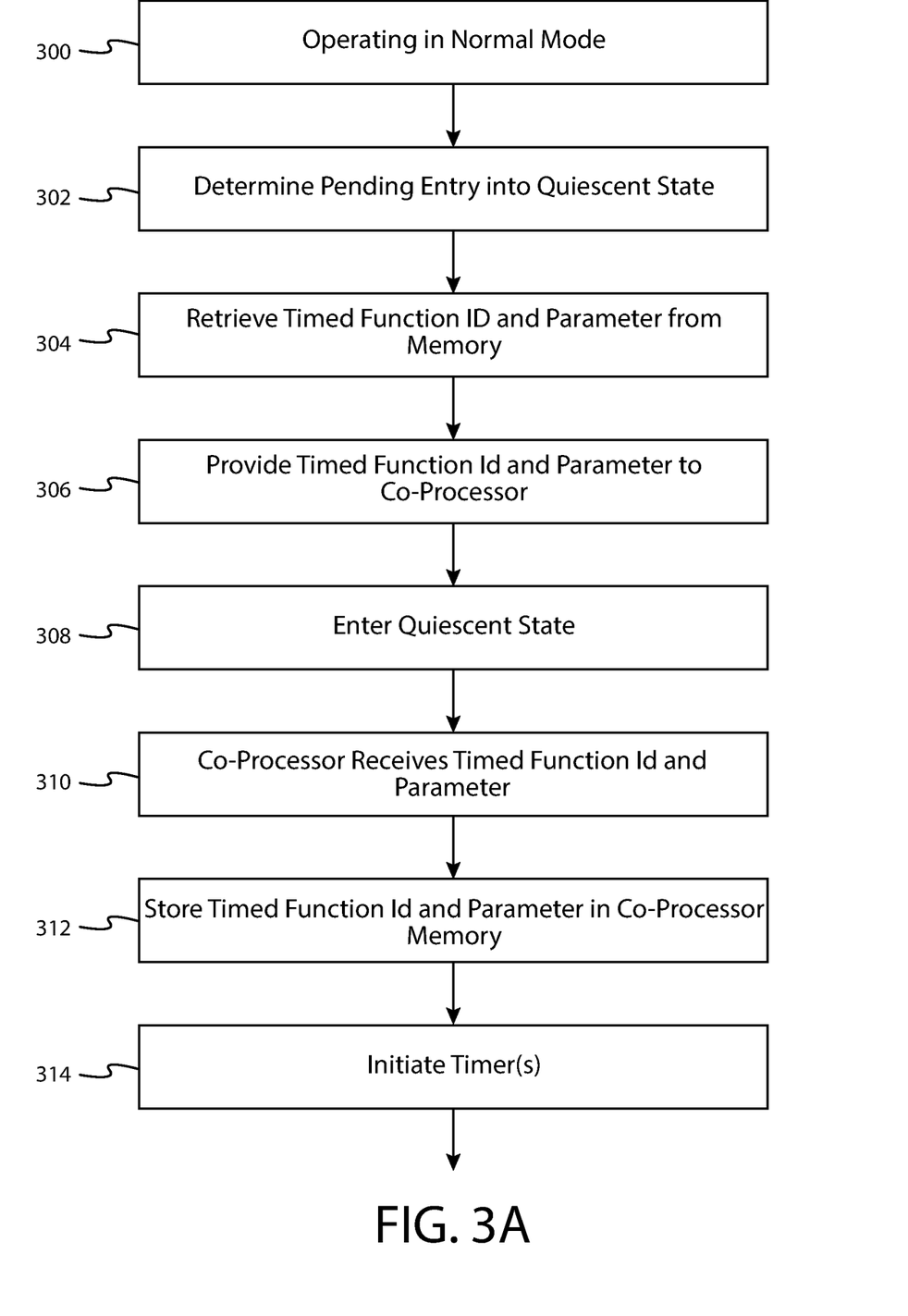
FIGS. 3A and 3B are flow diagrams illustrating one embodiment of a method performed by a door/window sensor as shown in FIG. 2 for performing timed functions.
Figure 3B:
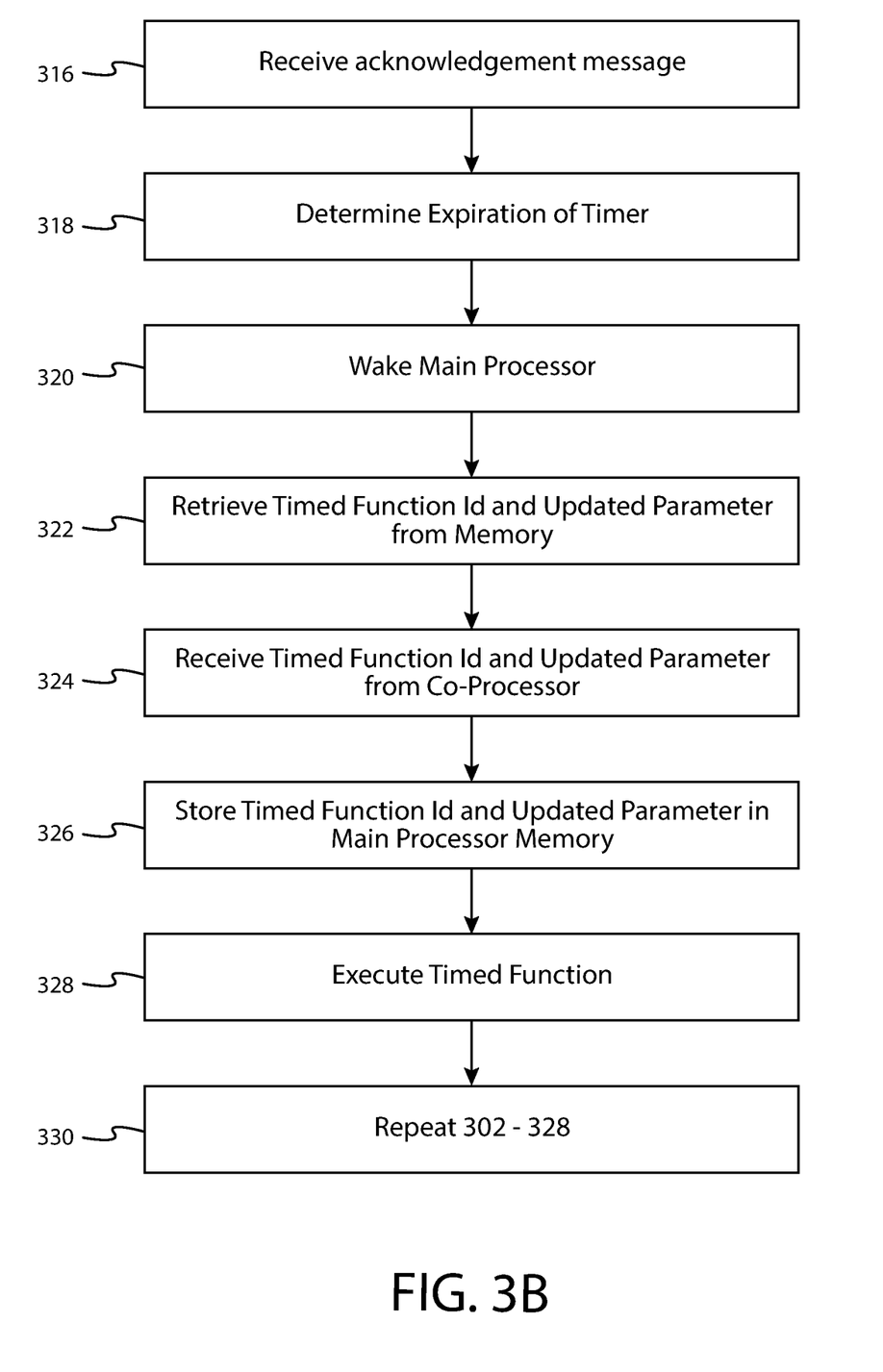

FIG. 3 is a flow diagram illustrating one embodiment of a method performed by a battery-powered, electronic device, such as door/window sensor 104, for performing timed functions. It should be understood that although the method is described in terms of a home security door or window sensor, the concepts described with respect to the method could be used in other types of security sensors, industrial sensors and control modules. It should be understood that in some embodiments, not all of the steps shown in FIG. 3 are performed. It should also be understood that the order in which the steps are carried out may be different in other embodiments.

At block 300, door/window sensor 104 is operating in normal mode, i.e., most or all of the functional blocks in FIG. 2 fully powered and operational, with main processor 200 transmitting status messages, receiving information from another node or from central controller 102, processing signals from detector 210, etc. Main processor 200 also executes one or more timed functions, i.e., periodic transmissions of "heartbeat" signals, modulation of indicator 212 upon the occurrence of certain events, such as message transmission, enrolling into central controller 102, detecting tampering, etc., message re-transmission after a certain time period, etc.

At block 302, main processor 200 determines that it will enter a quiescent mode of operation, i.e., a mode of operation where main processor 200, as well as one or more other components, operate in an unpowered or low-power consumption state. The determination is typically made when main processor 200 is relatively inactive for a predetermined amount of time, such as for three seconds, i.e., it is not processing signals from detector 210, or actively transmitting or receiving information via transceiver 204. In another example, main processor 200 determines that it will enter the quiescent mode when it determines that it must stay in the normal mode for more than a predetermined, desirable time period in order to perform a timed function. For example, if main processor 200 is performing a timed function of blinking indicator 212 3 times (for a total of 3 seconds), followed by a lull time of 10 seconds (for example, to indicate tampering of door/window sensor 104), main processor 200 determines that it will enter the quiescent state if the predetermined, desirable time is set to 4 seconds, as the 10 second lull time exceeds the predetermined, desirable time More generally, main processor 200 may determine to enter the quiescent state when main processor 200 is performing a timed function and at least some of the timed function requires waiting for a particular time to elapse, or waiting for a particular time to arrive, where the wait time exceeds the predetermined, desirable time period.

At block 304, in response to determining that main processor 200 will enter the quiescent mode of operation, main processor 200 retrieves an identification of one or more timed functions being processed by main processor 200, as well as one or more parameters associated with each timed function from a volatile memory (such as RAM) of main processor memory 202. For example, main processor 200 may executing three timed functions simultaneously: periodic transmission of a heartbeat message, causing indicator 212 to blink at a rate of one per second for half a second for three times, off for 10 seconds, and then repeating, to indicate that tamper detection device 214 has detected tampering, and a retransmission function to re-send a message via transceiver 204 if an acknowledgement message is not received from central controller 102 after initial transmission of the message.

In another embodiment, main processor 200 retrieves an identification of one or more timed functions and associated parameters associated with each timed function and passes them to co-processor 206 without a determination that main processor 200 will enter the quiescent state. In this embodiment, each time that main processor 200 starts a timed function, an identification of the timed function and a parameter associated with the function, such as time when action is needed to continue performing the timed event, is passed from main processor 200 to co-processor 206. Co-processor 206 manages the timed function, generally, be starting a timer to determine when the time has elapsed and then notifying main processor 200. Main processor 200 may or may not be in a quiescent state when notification is provided.

In the case of the heartbeat timed function, main processor 200 may monitor a software heartbeat countdown timer that indicates a remaining time left before a new heartbeat message should be transmitted. The countdown timer is reset and initiated after transmission of a heartbeat message, and set to a relatively long time period, such as one hour, one day or something in between. When main processor 200 determines it will enter the quiescent state, main processor retrieves an identification of the heartbeat function from main processor memory 202 as well as a parameter related to the heartbeat function, in this case, the time remaining on the heartbeat countdown timer. In this example, the remaining time left before transmission of the next heartbeat signal is 39 minutes. Of course, instead of a countdown timer, main processor 200 could initiate and monitor a timer that counts up to a predetermined number and transmit a heartbeat message when the timer equals the predetermined number. All such "countdown" timers referenced herein could alternatively be "count up" timers.

In the case of the blink timed function, the parameters may comprise a status of indicator 212 (i.e., "on", "off"), a "lull" time, i.e., a time period in between a series of blinks of indicator 212 (i.e., ten seconds), an "on" time", i.e., how long indicator 212 is illuminated/sounded during a blink, an "off" time, i.e., how long indicator 212 is off during a blink series, and a number of blink cycles (i.e., perform a blink cycle 3 ties). The parameters may also comprise a remaining time of any point during the blink function, i.e., 200 ms remaining for illumination of indicator 212 during a particular blink. When main processor 200 determines it will enter the quiescent state, main processor retrieves an identification of the blink function from main processor memory 202 as well as the parameters related to the blink function, in this case, the on time during blinks (in this case, half a second), the off time during blinks (in this case, one second), a number of times to repeat each on/off cycle (in this case, 3), the lull time (in this case, ten seconds) and an indication of where in the cycle the blind function is presently, i.e., 200 ms left in the second illumination out of three blinks.

In another embodiment, the parameters of the blink timed function comprise only a single, remaining time for a remaining portion of the blink function and a current status of indicator 212, such as "on" or "off". Using the example above, the parameters comprise 10 seconds as the time remaining to wake main processor 200 and an indication that indicator 212 is presently not illuminated (conversely, a state that indicator 212 should be placed upon expiration of the 10 second time period, i.e., that indicator 212 should be illuminated when the 10 second time period elapses).

In the case of the retransmit timed function, main processor 200 may monitor a software retransmit countdown timer that indicates a remaining time left before retransmission of a message that was previously transmitted. The retransmit countdown timer is reset and initiated after an initial transmission, or a re-transmission, of a message. For example, the retransmit countdown timer could be set to thirty seconds after transmission of a message via transceiver 204. If an acknowledgement message is not received from central controller 102 within thirty seconds, the retransmit countdown timer expires, and main processor 200 retransmits the message, resetting the retransmit countdown timer once again. When main processor 200 determines it will enter the quiescent state, main processor retrieves an identification of the retransmit function from main processor memory 202 as well as a parameter related to the retransmit function, in this case, the time remaining on the retransmit countdown timer, equal to 27 seconds, in this example. In another embodiment, an additional parameter may be retrieved from main processor memory 202 indicating a number of retransmissions remaining before canceling any further retransmissions.

At block 306, main processor 200 provides the timed function identifications and related parameters for each to co-processor 206.

At block 308, main processor 200 provides notice to co-processor 206 that it is about to enter the quiescent state. In another embodiment, no notice is provided. Rather, providing the timed function identifications and parameters acts as notice to co-processor 206 that main processor 200 is about to enter the quiescent state.

At block 308, main processor 200 may cause removal of power from one or more other components of door/window sensor 104 and/or may cause one or more components to operate in a low-power consumption state. For example, main processor 200 may remove power from at least a portion of main processor memory 202, such as a RAM portion of main processor memory 202, and transceiver 204. Removing power from RAM causes the timed function identifications and any parameters related to the timed functions to become erased. After the components have been either powered off or powered into a low-power consumption state, main processor 200 enters a quiescent state of operation, reducing its power consumption considerably but remaining ready to respond to wake signals provided by co-processor 206 or signals from detector 210.

At block 310, co-processor 206 receives the timed function identifications and parameters related to each of the timed function identifications.

At block 312, co-processor 206 stores the timed function identifications and parameters related to each of the timed function identifications in co-processor memory 208.

At block 314, co-processor 206 initiates one or more timers associated with the timed function identifications and the parameters. For example, co-processor 206 starts a heartbeat timer related to the heartbeat timed function, a blink timer related to the blink timed function, and a retransmit timer related to the retransmit timed function. Each timer is set to a value as provided in a respective parameter as provided by main processor 200. For example, the heartbeat timer is set to 39 minutes. A blink timer is set to 10 seconds, representing the long lull time that indicator 212 remains extinguished/silent in between blink sequences. Finally, a retransmit timer is set to 27 seconds, representing the time remaining to retransmit the message originally transmitted by transceiver 204 if an acknowledgement is not received.

At block 316, transceiver 204 may receive an acknowledgment message from central controller 102, in response to transceiver 204 previously sending a status message to central controller 102. In this case, transceiver may maintain either a low power or fully powered state while main processor 200 and/or one or more other components are in a quiescent state. If an acknowledgement message is received, transceiver may cause main processor 200 to exit the quiescent state in order to process the acknowledgment message. In response, main processor 200 may exit the quiescent state into the normal state, or into a low-power state specifically to process the acknowledgement message. Main processor 200 may then cancel the retransmit timed function by either notifying co-processor 206, causing co-processor 206 to cancel the retransmit function, i.e., the timer associated with retransmission, or main processor 200 may store an indication in main processor memory 202 to ignore a wake up signal from co-processor 206 when the retransmit timer expires as monitored by co-processor 206. In the latter case, main processor 200 stores a timed function identification of the retransmit function in main processor memory 202 and an indication, such as a "1" or a "0" to indicate to main processor 200 to ignore a wake signal from co-processor 206 when the retransmit time expires.

At block 318, co-processor determines that one or more of the timers has expired, indicating that it is time to perform one of the timed functions. In this example, the blink timer expired, indicating that it is now time to illuminate indicator 212.

At block 320, in response to the blink timer expiring, co-processor 206 wakes main processor 200, typically by sending an interrupt to main processor 200. Main processor 200, in turn, returns itself and one or more other components to the normal state.

At block 322, co-processor 206 retrieves the timed function identification related to the blink function, and in some embodiments, updated parameter information, such as information pertaining to whether to illuminate or extinguish indicator 212 or a number of times remaining to perform the blink timed function. In one embodiment, co-processor 206 also provides a time that indicator 212 should remain illuminated or, more generally, a time for a next portion of the blink function. Co-processor 206 then sends the timed function ID and updated parameter(s) to main processor 200.

In one embodiment, co-processor 206 also provides updated parameters to main processor 200 relating to the other timed functions whose timers did not expire. For example, when the blink timer expires, co-processor 206 also provides main processor with the time remaining on the heartbeat timer (i.e., 26 minutes and 800 ms) and retransmit timer (i.e., 26 seconds and 800 ms).

At block 324, main processor 200 receives at least the timed function identification of the blink function, and the updated parameter information indicating that main processor 200 should illuminate/sound indicator 212. In another embodiment, main processor 200 receives an additional parameter, such as a number of times remaining to perform the blink function.

At block 326, main processor 200 stores the received timed function identification information and updated parameters in main processor memory 202.

At block 328, main processor 200 executes the timed function using the updated parameters received from co-processor 206 at block 322. For example, main processor sets a heartbeat timer to 38 minutes and 800 ms, illuminates/sounds indicator 212 and sets an blink timer for one second (representing the first blink of the blink sequence, and a retransmit timer to 26 seconds and 800 ms, and then starts all three timers.

At block 330, blocks 302 through 328 are repeated as necessary.

Figure 4:
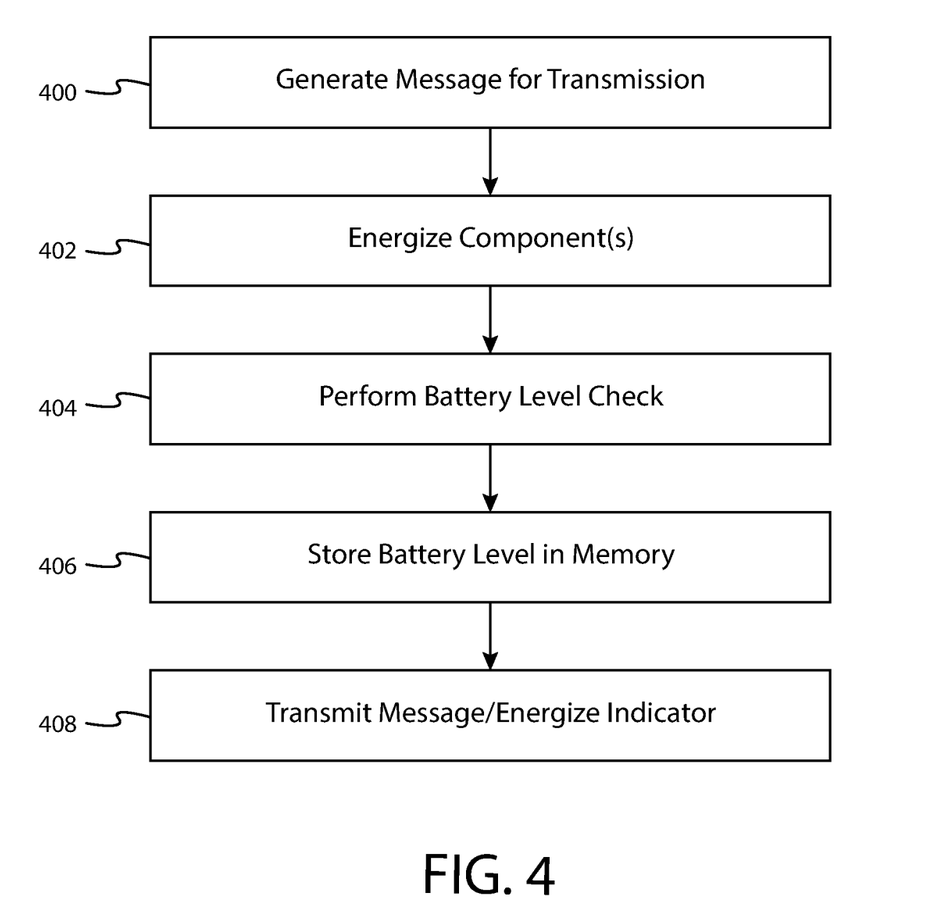
FIG. 4 is a flow diagram illustrating one embodiment of a method performed by one of the electronic devices as shown in FIG. 1 for performing battery level measurements.

FIG. 4 is a flow diagram illustrating one embodiment of a method performed by a battery-powered, electronic device, such as door/window sensor 104, for performing battery level measurements. It should be understood that although the method is described in terms of a home security door or window sensor, the concepts described with respect to the method could be used in other types of security sensors, industrial sensors and control modules. It should be understood that in some embodiments, not all of the steps shown in FIG. 4 are performed. It should also be understood that the order in which the steps are carried out may be different in other embodiments. It should be further understood that while the method is described in terms of main processor 200 of FIG. 2, the concepts described by the method could be applied in applications where no co-processor is used.

At block 400, main processor 200 generates a message for transmission to central controller 102. The message may be in response to main processor 200 receiving one or more signals from detector 210, or upon expiration of a timer of a timed function, such as expiration of a heartbeat timer or a retransmit timer. The message may alternatively be generated in response to transceiver 204 receiving a status request from central controller 102, asking door/window sensor 104 to transmit a status of a door or window being monitored.

At block 402, in response to receiving one or more signals from detector 210, or upon expiration of a timer of a timed function, main processor 200 prepares to transmit a message and/or energize indicator 212 by energizing one or more components of door/window sensor 104, such as transceiver 204 in preparation for transmitting a message to central controller 102 and/or driver circuitry in preparation for illuminating/sounding indicator 212. Energizing these components places an additional current draw on battery 220. Energizing transceiver 204 and/or the driver circuitry 218 does not mean that transceiver 204 is transmitting or receiving messages, or that indicator 212 is illuminated/sounding.

At block 404, main processor 200 performs a battery level check when most or all of the components of door/window sensor 104 are no longer in a quiescent state, including transceiver 104 and/or driver circuitry 218. Main processor 200 performs a battery level check by measuring a DC voltage of battery 220 while most or all of the components of door/window sensor 104 are no longer in a quiescent state, i.e., energized by necessarily active ("active" meaning, for transceiver 204, transmitting or receiving a message and, for driver circuitry 218, causing indicator 212 to illuminate/sound).

At block 406, main processor 200 stores the battery voltage reading taken at block 404 in main processor memory 202, for possible transmission to central controller 102.

At block 408, main processor 200 causes transceiver 204 to transmit a message and/or indicator 212 to illuminate/sound. It should be understood that in another embodiment, the battery level check of block 404 occurs immediately after transmission of a message and/or immediately after illumination/sounding of indicator 212.

Figure 5A:
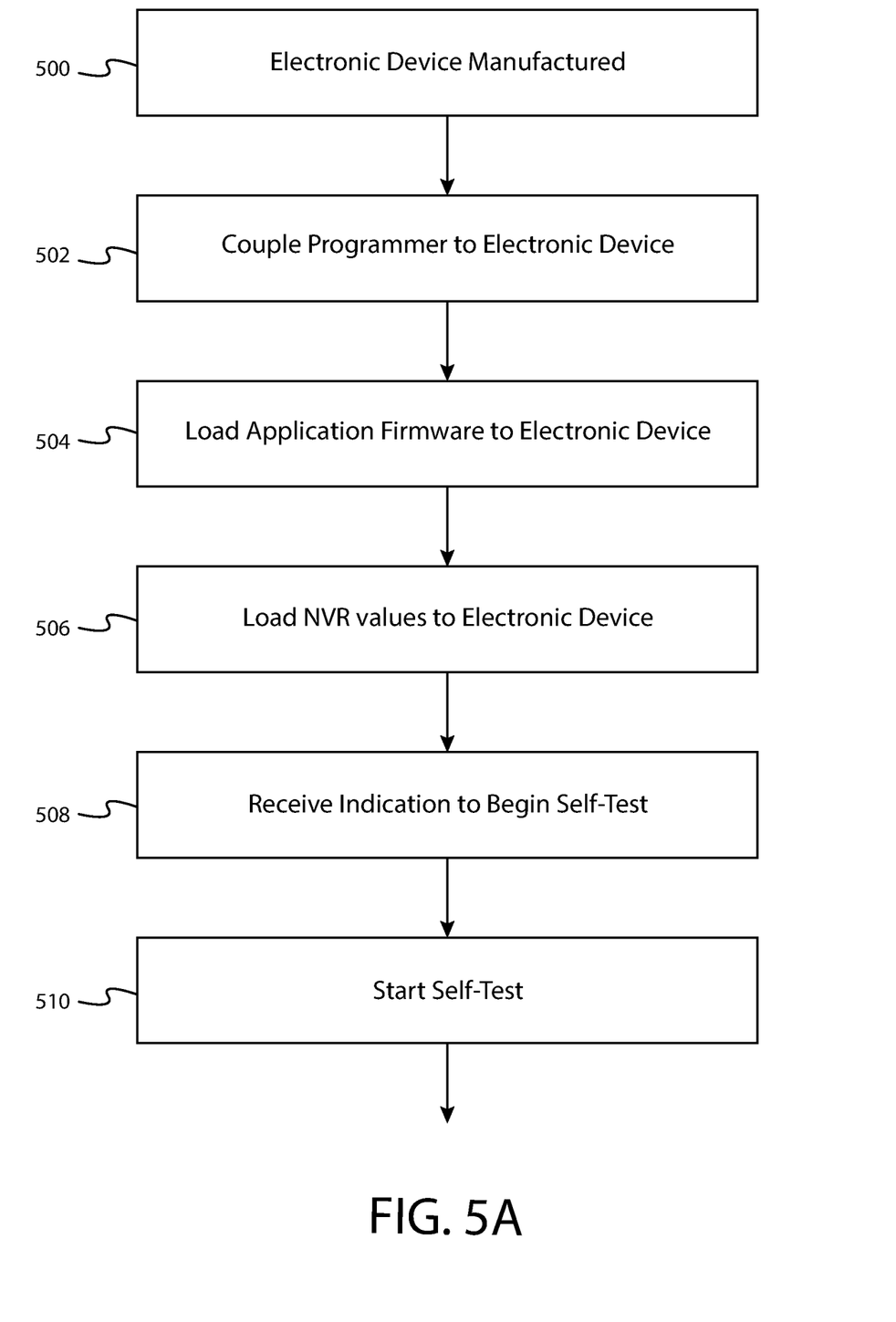
FIGS. 5A and 5B are flow diagram illustrating one embodiment of a method for checking NVR values of one of the battery-powered, electronic devices as shown in FIG. 1 during mass-production of electronic devices.
Figure 5B:
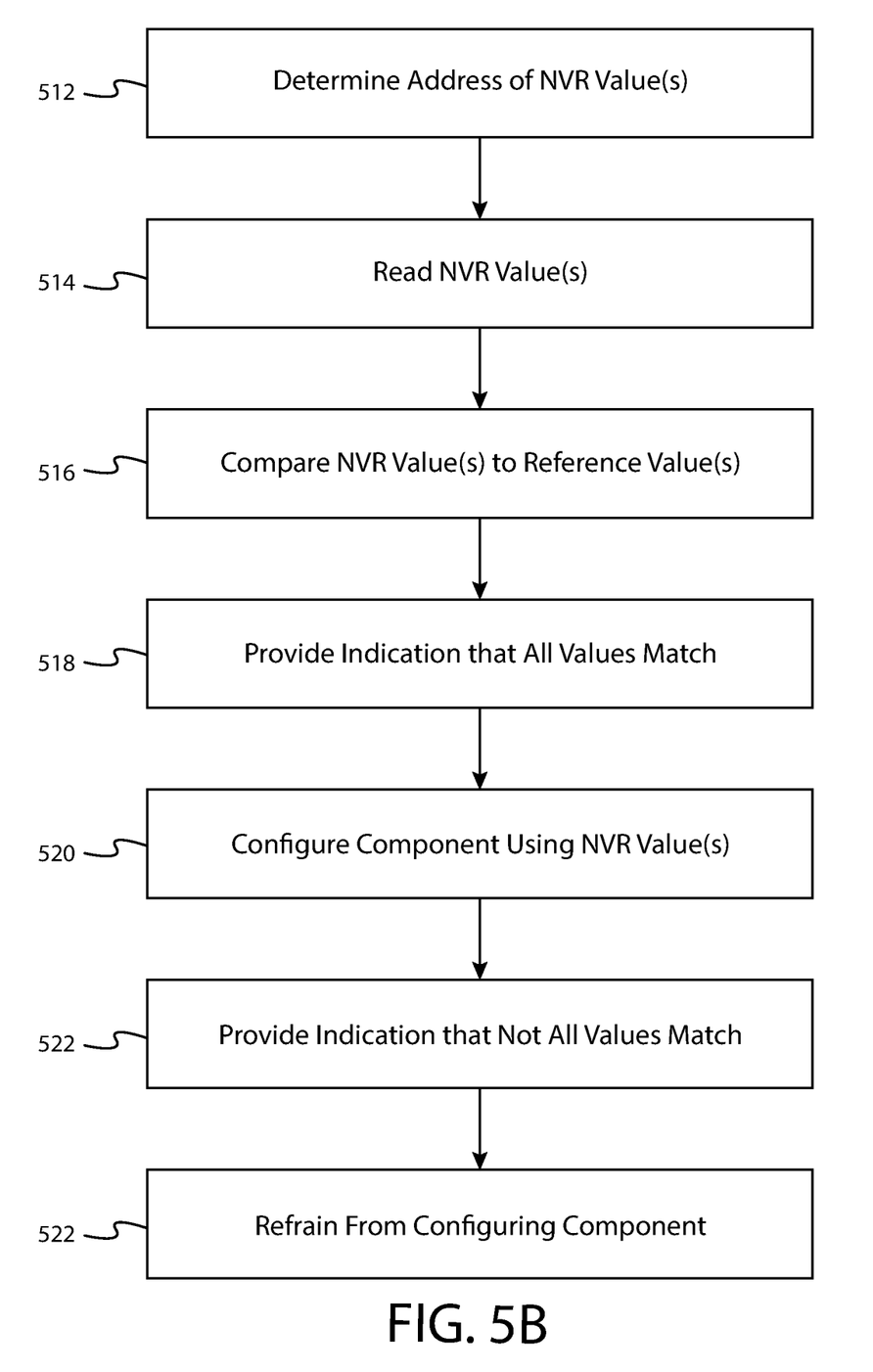

FIG. 5 is a flow diagram illustrating one embodiment of a method for checking non-volatile register (NVR) values of an electronic device, such as door/window sensor 104, during mass-production of door/window sensor 104. It should be understood that although the method is described in terms of checking a home security door or window sensor, the concepts described with respect to the method could be used to check other types of security sensors, industrial sensors and control modules. It should be understood that in some embodiments, not all of the steps shown in FIG. 5 are performed. It should also be understood that the order in which the steps are carried out may be different in other embodiments. It should be further understood the method may be used in applications with or without the use of a co-processor. For purposes of illustration, the method of FIG. 5 will be discussed assuming that no co-processor is used.

The method of FIG. 5 is typically used in a mass-production manufacturing factory to check NVR values stored in a non-volatile memory area of main processor memory 202 before units leave the factory. In the past, checking the NVR values has not been conducted, due to the relative inaccessibility of NVR values on the production line. Ensuring that each unit is properly programmed with the correct NVR values avoids failures in the field and the costs associated with returns.

Generally, NVR values comprise numerical constants that are used by main processor 200 to perform the functionally of door/window 104. Examples of such numerical constants comprise a standard, or maximum, transmission power level, a number of transmission re-tries when transmission of a message is not acknowledged, "lock bits" that indicate portions of memory 202 that may, or may not, not be overwritten by processor 200 (such as in the case of an over-the-air firmware update after door/window sensor 104 has been installed in the field, where the lock bits allow portions of memory 202 to be overwritten with a firmware update provided over-the-air), etc. Other examples comprise an NVR "Rev" constant, an NVR "PINS" constant, and NVR "NVMCS" constant, an NVR "NVMT" constant, an NVR "NVMS" constant, an NVR "NVMP" constant, an NVR "HW" constant, and an application serial number constant.

Figure 6:
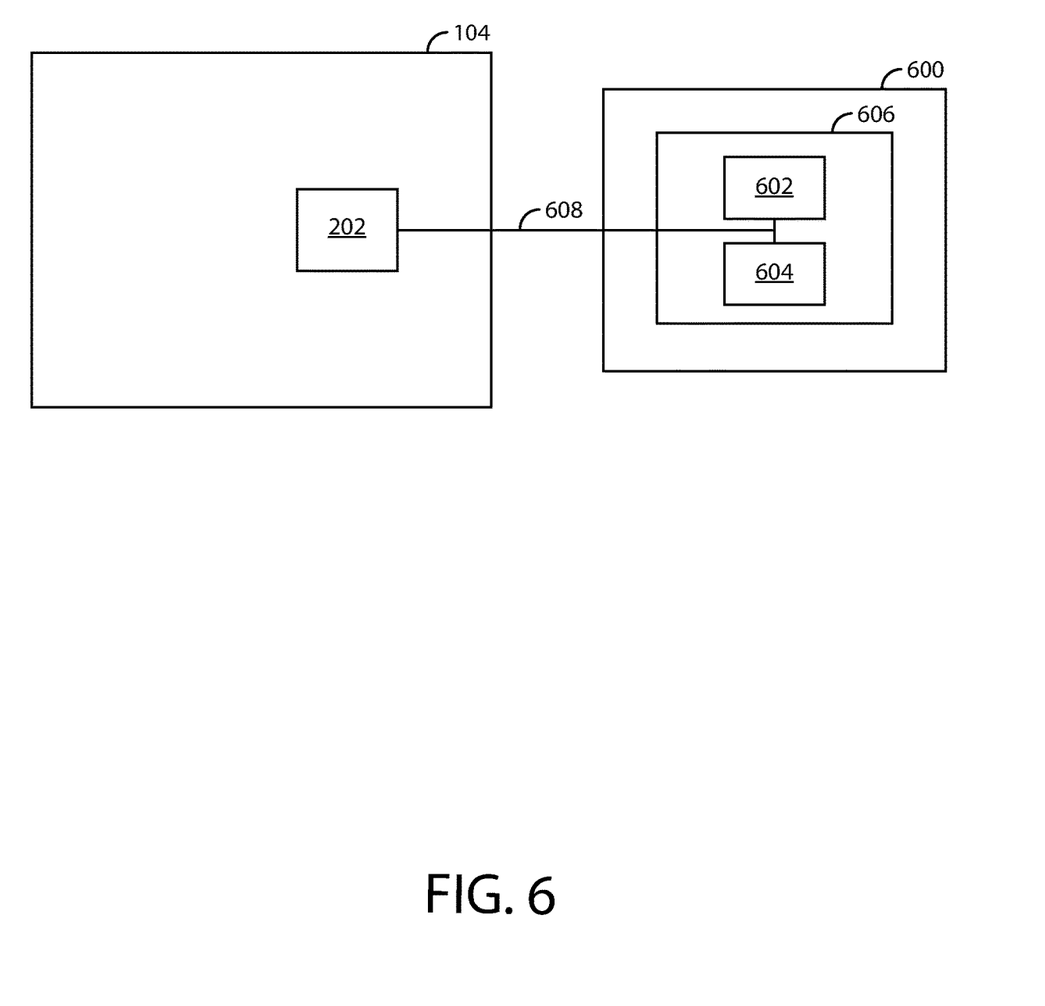
FIG. 6 is a functional block diagram of one embodiment of a programmer that is used to program an electronic device in accordance with the teachings herein.

FIG. 6 is a functional block diagram of door/window sensor 104 being tested in a factory setting using programmer 600. After door/window sensor 104 has been assembled with the various components that comprise door/window sensor 104 (i.e., processor 200, memory 202, sensor(s) 218, etc.), programmer 600 is electronically coupled to door/window sensor 104 via, in one embodiment, an interface cable 608 to load a first portion of processor memory 202 with application firmware 602 for causing main processor 200 to perform the functionality of door/window sensor 104, as well as for loading a second portion of main processor memory 202 with NVR values 604 (door/window sensor 104 shown in FIG. 6 omits all components except for main processor memory 202 for purposes of clarity). Interface cable 604 may comprise a multi-connector, parallel or serial bus, utilizing, in one embodiment a UART built into main processor 200 and programmer 600. Both application firmware 602 and NVR values 604 are stored in programmer memory 606. The application firmware 602 comprises a self-test and reference NVR values that are compared to the NVR values stored in the second portion of main processor memory 202.

Referring back to the method of FIG. 5, at block 500, door/window sensor 104 has been manufactured to a point where all or most of the primary components have been installed onto a circuit board of door/window sensor 104, i.e., soldered in place. In one embodiment main processor 200, main memory 202 and transceiver 204 are incorporated into a Z-wave 700 series ZGM130S SIP Module.

At block 502, programmer 600 is coupled to door/window sensor 104, typically via a serial port of main processor 200, although in other embodiments, one or more other serial ports and/or parallel ports are used.

At block 504, programmer 600 loads compiled application firmware 602 into main processor memory 202. The compiled application firmware 602 comprises processor-executable instructions for main processor 200 to perform the functionality of door/window sensor 104. For example, to detect when a door or window has been opened, to communicate with central controller 102, to perform overhead functions, such as transmission of a tamper message when door/window sensor 104 has been tampered with, a battery-low indication message when battery 220 is low, transmission of a variety of status messages, etc. The compiled application firmware 602 additionally comprises a self-test and reference NVR values, which will be explained in more detail below.

At block 506, programmer 600 loads the NVR values into the second portion of main memory 202.

At block 508, main processor 200 receives an indication to start the self-test. In one embodiment, the indication comprises a voltage change in a test point coupled to main processor 200, for example, as programmer 600 causes the test point to become grounded. Of course, other methods could be used to cause main processor 200 to start the self-test, as is known in the art.

At block 510, main processor 200 starts the self-test by executing a portion of the processor-executable code loaded into the first portion of main memory 202. The self-test comprises one or more comparisons between NVR values stored in the second portion of main processor memory 202 with the reference values defined in the application firmware 602. Such reference values may be defined in source code of the application firmware 602 as constants. For example, in C programming language, a constant may be defined by the #define preprocessor directive or the "const" keyword, as well known in the art. The reference values may define NVR values such as the maximum transmission power allowed, lock bits that indicate which areas of main processor memory 202 may be overwritten by application code 602, one or more encryption keys, etc., and an address in main processor memory corresponding to each reference value.

At block 512, main processor determines which area(s) of the second portion of main processor memory 202 it will read, based on the address information of the reference values found in the application firmware 602.

At block 514, main processor 200 reads one or more NVR values from the second portion of main memory 202 at address(es) specified in the application firmware 602.

At block 516, main processor 200 compares the NVR value(s) from the second portion of main memory 202 with the reference values defined in the application firmware 602.

At block 518, if main processor 200 determines that all of the NVR values from the second portion of main memory 202 match the reference values defined in the application firmware 602, main processor 200 provides an indication of such. In one embodiment, main processor 200 causes indicator 212 to illuminate/sound in a way that conveys the match. For example, main processor 200 may cause indicator 212 to illuminate/sound steadily, blink or sound at a first rate, etc. Alternatively, or in addition, main processor 200 generates a message indicating that all of the values matched, and provides the message to programmer 600, which stores the message in association with door/window sensor 104, for example, in association with a serial number of door/window sensor 104. In one embodiment, the message may be provided to programmer 600, for example, via an interface cable 608 between programmer 600 and door/window sensor 104.

At block 520, when main processor 200 determines that all of the NVR values from the second portion of main memory 202 match the reference values defined in the application firmware 602, main processor 200 may configure another component of door/window sensor 104, such as transceiver 204, with one or more of the NVR values stored in the second portion of main processor memory 202.

At block 522, if main processor 200 determines that not all of the NVR values from the second portion of main memory 202 match the reference values defined in the application firmware 602, main processor 200 provides an indication, different than the indication described at block 518, in a way that conveys the mis-match. For example, main processor 200 may cause indicator 212 to illuminate/sound steadily, blink or sound at a second rate, etc. Alternatively, or in addition, main processor 200 generates a message indicating that not all of the values matched, and provides the message to programmer 600, which stores the message in association with door/window sensor 104, for example, in association with a serial number of door/window sensor 104. In one embodiment, the message comprises an ASCII-coded indication of each value and whether each value in the second portion of main processor memory 202 matched a corresponding reference value defined by the application firmware 602, along with, in one embodiment, the actual values read from the second portion of main processor memory 202 and corresponding reference values as defined by the application firmware 602. In another embodiment, the message comprises only the values that did not match each other. In any case, the message may be provided to programmer 600, for example, via a interface cable 608 connection between programmer 600 and door/window sensor 104.

At block 524, when main processor 200 determines that not all of the NVR values from the second portion of main memory 202 match the reference values defined in the application firmware 602, main processor 200 may refrain from configuring another component of door/window sensor 104 with at least one or more of the NVR values from the second portion of main memory 202. For example, main processor 200 may not configure transceiver 204 with a maximum transmission power level value stored in the second portion of main processor memory 202. In another embodiment, main processor 200 configures one or more other components using one or more NVR values from the second portion of main memory 202 if those values match the reference values defined by the application firmware 602, and one or more reference values defined by the application firmware 602 for NVR values that do not match the reference values defined by the application firmware 602.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A battery-powered, electronic device, comprising:
a memory for storing processor-executable instructions;
a co-processor; and
a main processor coupled to the co-processor and the memory for executing the processor-executable instructions that causes the main processor to:
determine that the main processor will enter a quiescent state;
identify a timed function that is being maintained by the main processor, the timed function comprising a function performed by the main processor that is dependent on time;
send an identification of the timed function and a parameter associated with the timed function to the co-processor; and
enter the quiescent state after sending the identification and the parameter to the co-processor.

2. The battery-powered, electronic device of claim 1, wherein the processor-executable instructions comprise further instructions that causes the main processor to:
receive a wake signal from the co-processor after entering the quiescent state;
after receiving the wake signal, receive the identification of the timed function and an updated parameter from the co-processor associated with the timed function; and
execute the timed function in accordance with the updated parameter.

3. The battery-powered, electronic device of claim 1, wherein the instructions that causes the main processor to send the identification and the parameter to the co-processor comprises instructions that causes the main processor to:
periodically send the identification and the parameter to the co-processor, the parameter updated each time the identification and the parameter is sent.

4. The battery-powered, electronic device of claim 2, wherein the updated parameter comprises a time remaining to perform the timed function.

5. The battery-powered, electronic device of claim 2, wherein the updated parameter comprises a remaining number of times to perform an action associated with the timed function.

6. The battery-powered, electronic device of claim 2, wherein the timed function comprises periodic transmission of a heartbeat signal, the battery-powered, electronic device further comprising:
a transmitter coupled to the main processor;
wherein the instructions that causes the main processor to execute the timed function comprises instructions that causes the main processor to:
transmit the heartbeat signal in accordance with the updated parameter from the co-processor.

7. The battery-powered, electronic device of claim 2, wherein the timed function comprises periodic blinking of an indicator, the battery-powered, electronic device further comprising:
the indicator coupled to the main processor;
wherein the instructions that causes the main processor to execute the timed function comprises instructions that causes the main processor to:
blink the indicator in accordance with the updated parameter from the co-processor.

8. The battery-powered, electronic device of claim 2, wherein the timed function comprises retransmission of a status message, the battery-powered, electronic device further comprising:
a transmitter coupled to the main processor;
wherein the instructions that causes the main processor to execute the timed function comprises instructions that causes the main processor to:
retransmit the status message in accordance with the updated parameter from the co-processor.

9. The battery-powered, electronic device of claim 1, wherein the processor-instructions that causes the main processor to determine that the battery-powered, electronic device will enter the quiescent state comprises instructions that causes the main processor to:
determine a remaining time to perform a subsequent action associated with the timed function;
determine that the remaining time exceeds a desirable time to operate the battery-powered, electronic device in a normal operational state; and
enter the quiescent state when the remaining time exceeds the desirable time.

10. A method for performing timed functions by a battery-powered, electronic device, comprising:
determining that the battery-powered, electronic device will enter a quiescent state;
identifying a timed function that is being maintained a main processor of the battery-powered, electronic device, the timed function comprising a function performed by the main processor that is dependent on time;
sending an identification of the timed function and a parameter associated with the timed function to a co-processor coupled to the main processor; and
entering the quiescent state after sending the identification and the parameter from the main processor to the co-processor.

11. The method of claim 10, further comprising:
receiving a wake signal from the co-processor after entering the quiescent state;
after receiving the wake signal, receiving the identification of the timed function and an updated parameter from the co-processor associated with the timed function; and
executing the timed function by the main processor in accordance with the updated parameter.

12. The method of claim 10, wherein sending the identification and the parameter to the co-processor comprises:
periodically sending the identification and the parameter to the co-processor, the parameter updated each time the identification and the parameter is sent.

13. The method of claim 11, wherein the updated parameter comprises a time remaining to perform the timed function.

14. The method of claim 11, wherein the updated parameter comprises a remaining number of times to perform an action associated with the timed function.

15. The method of claim 11, wherein the timed function comprises periodic transmission of a heartbeat signal, the method further comprising:
transmitting the heartbeat signal in accordance with the updated parameter.

16. The method of claim 11, wherein the timed function comprises periodic blinking of an indicator, the method further comprising:
blinking the indicator in accordance with the updated parameter.

17. The method of claim 11, wherein the timed function comprises retransmission of a status message, the method further comprising:
retransmitting the status message in accordance with the updated parameter.

18. The method of claim 10, wherein determining that the battery-powered, electronic device will enter the quiescent state comprises:
determining a remaining time to perform a subsequent action associated with the timed function;
determining that the remaining time exceeds a desirable time to operate the battery-powered, electronic device in a normal operational state; and
entering the quiescent state when the remaining time exceeds the desirable time.

* * * * *